US009305449B2

(12) United States Patent
Goszyk

(10) Patent No.: US 9,305,449 B2
(45) Date of Patent: Apr. 5, 2016

(54) LASER OBSTACLE DETECTOR

(76) Inventor: Kurt A. Goszyk, Washington Crossing, PA (US)

( * ) Notice: Subject to any disclaimer, the term of this patent is extended or adjusted under 35 U.S.C. 154(b) by 131 days.

(21) Appl. No.: 14/233,563

(22) PCT Filed: Jul. 20, 2012

(86) PCT No.: PCT/US2012/047547
§ 371 (c)(1),
(2), (4) Date: Apr. 23, 2014

(87) PCT Pub. No.: WO2013/013127
PCT Pub. Date: Jan. 24, 2013

(65) Prior Publication Data
US 2014/0274205 A1    Sep. 18, 2014

Related U.S. Application Data

(60) Provisional application No. 61/509,788, filed on Jul. 20, 2011.

(51) Int. Cl.
*H04M 1/02* (2006.01)
*G01S 17/93* (2006.01)
*G08B 21/02* (2006.01)
*A61H 3/06* (2006.01)
*H04M 1/725* (2006.01)

(52) U.S. Cl.
CPC ............... *G08B 21/02* (2013.01); *A61H 3/061* (2013.01); *G01S 17/93* (2013.01); *H04M 1/0264* (2013.01); *H04M 1/0272* (2013.01); *H04M 1/72594* (2013.01); *A61H 2003/063* (2013.01); *A61H 2003/065* (2013.01); *A61H 2201/0153* (2013.01); *A61H 2201/0184* (2013.01); *A61H 2201/5092* (2013.01); *H04M 2250/52* (2013.01)

(58) Field of Classification Search
CPC .. G08B 21/02; H04M 1/0264; H04M 1/0272; H04M 1/72594; H04M 2250/52; G01S 17/93; A61H 3/061; A61H 2201/5092; A61H 2003/063; A61H 2003/065; A61H 2201/0153; A61H 2201/0184
See application file for complete search history.

(56) References Cited

U.S. PATENT DOCUMENTS

2002/0057832 A1 * 5/2002 Proesmans ......... G01B 11/2513
                                                              382/154
2006/0215176 A1 * 9/2006 Van Coppenolle .. G01B 11/002
                                                              356/603

FOREIGN PATENT DOCUMENTS

SE   WO 2004036246 A1 * 4/2004 ............... H04M 1/21
WO      2004036246 A1    4/2004
WO   WO 2004036246 A1 * 4/2004 ............... G01S 17/08

OTHER PUBLICATIONS

Yuan, D. et al., "Dynamic Environment Exploration Using a Virtual White Cane", CVPR 2005 Proceedings of the 2005 IEEE Computer Society Conference on Computer Vision and Pattern Recognition (CVPR '05), 1(1):243-249.*
International Preliminary Report on Patentability, issued Jan. 21, 2014, in counterpart PCT Application No. PCT/US2012/047547.

* cited by examiner

*Primary Examiner* — Chuong A Ngo
(74) *Attorney, Agent, or Firm* — Duane Morris LLP

(57) ABSTRACT

The present invention provides a device for assisting a person in determining the presence or identity of obstacles in the person's path, characterized by a housing, a laser projector for generating a laser pattern in a surface in said person's path, a receiver for at least receiving a plurality of images of the laser pattern reflected from the surface and for generating a signal corresponding to said laser pattern reflection and a processor for processing said signal to at least determine the presence or identity of an object, and a warning generator for generating a warning to the person. The present invention also provides a method for assisting a person in determining the presence of an object in a person's path comprising generating a laser pattern comprising a plurality of laser lines on a surface, distinguishing between one or more straight line segments in the laser pattern and distorted line segments of said laser pattern after they are reflected from said surface and evaluating the distortions in said line segments of said laser pattern to determine the presence or identity of an object in the person's path. The present invention can be used to assist the visually impaired in seeing objects in their path or can be used by a sighted user in game play or at night for detecting obstacles. Some of the functions of the present device can be provided in a smart phone which can be adapted with a laser projection as a separate attachment or as part of the smart phone circuitry.

20 Claims, 7 Drawing Sheets

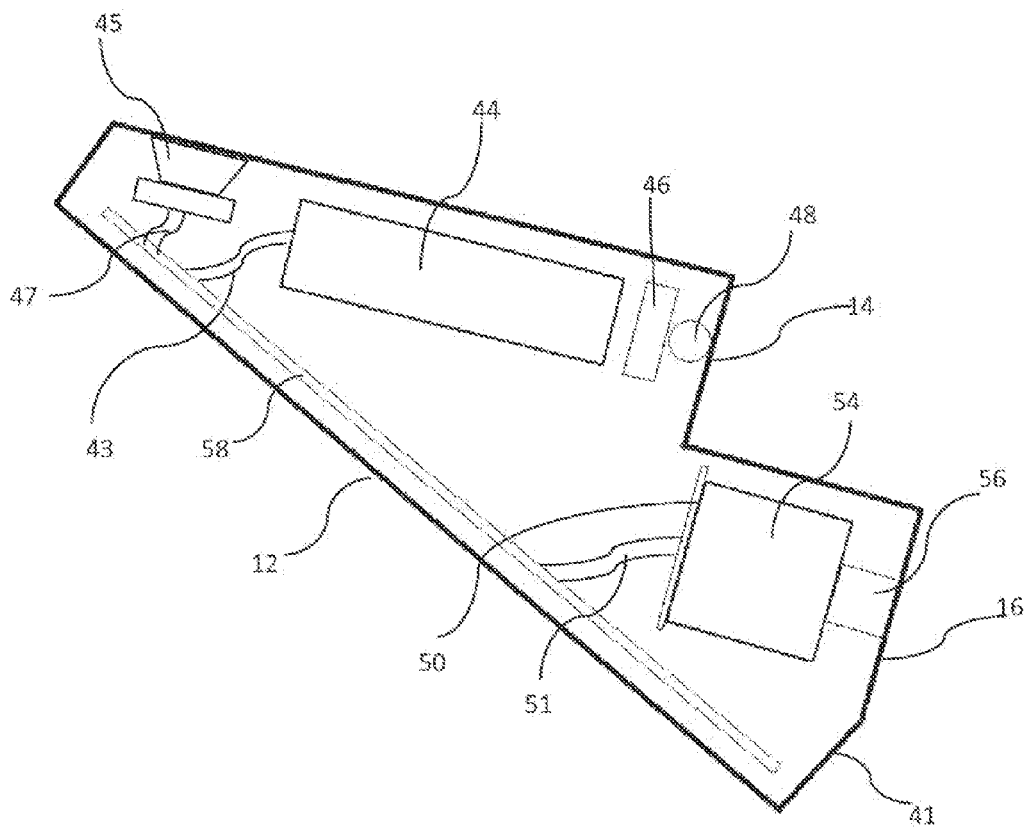
Figure 3.
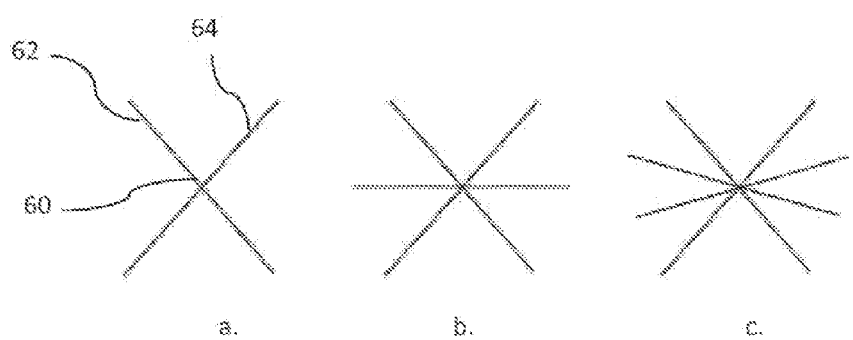
Figure 4a, b and c

LASER OBSTACLE DETECTOR

CROSS REFERENCE TO RELATED APPLICATIONS

This application is a national stage entry under 35 U.S.C. §371 of International Patent Application No. PCT/US2012/047547, which was filed Jul. 20, 2012 claiming the benefit of priority to U.S. Provisional Application Ser. No. 61/509,788, filed on Jul. 20, 2011, the entireties of which are herein incorporated by reference.

BACKGROUND

For the blind or visually impaired, the current state of technology, besides guide dogs, includes alternative devices based on mechanical designs (i.e. various types of canes and guide mechanisms) or ultra-sonic technologies. Although the blind and visually impaired have made great strides in education, employment, and information access, they have not benefited from any real breakthroughs in practical and affordable mobility devices that facilitate safe and independent travel outside of the home.

Although users may become very adept with a "pure" mechanical device, such as the traditional "long cane" or "white cane," there are inherent limitations to its use, most notably the requirement that the device actually touch the obstacle by a "swipe" or a "thrusting" or "probing" technique. This fact can put the person in considerable danger, even if successfully employed since typically, the probing motions are limited to close, ground-level obstacles.

Some recent attempts to improve upon the use of canes, involve the use of ultrasound. See, for example, U.S. Pat. No. 6,469,956, herein incorporated by reference. Scanning with an ultrasound wide beam will not easily find openings, especially from a distance. The device for generating an ultrasound beam is conical in shape, about 48 inches in diameter at 14 feet. Wind and temperature changes affect the ultrasound beam and will give false distances and alarms. If approaching an obstacle at less than 45° degrees, the ultra sonic signal tends to miss the obstacle because it is reflected away from smooth surfaces (e.g., smooth walls, and some smooth, contoured obstacles) and is a known disadvantage of ultra sonic detection devices in general. Thus, the typical ultra-sonic devices that have been marketed are simply not reliable enough to inspire the trust necessary for a blind person to rely on the sensory signals (i.e. sounds, musical notes, etc.) thereby negating one of the major positives to be expected from a primary visual assistance device, namely, a growing sense of self-confidence and trust in the device.

Use of guide or companion dogs has provided some people with increased mobility and self-sufficiency, but this benefit is limited to a small potion of the overall potential patient population for many reasons. Although guide dogs enjoy tremendous support among the general public as well as among the visually impaired population, there are a significant number of people who cannot use a guide dog or who cannot cope with some of the disadvantages inherent in using a "sight instrument" with independent action capabilities. Many people are allergic to, or don't like, dogs or their feed/grooming aids, and caring for the dog presents stresses and challenges that many vision and mobility impaired people are not able to handle without constant assistance from a sighted person. Dogs, just like people, have personalities which can be difficult to "match" and they also get sick, infirm and die, creating serious emotional and practical challenges.

An object of this invention is to provide an effective obstacle detection accessory to smart mobile electronic systems, such as portable game systems and mobile phones, for assisting the visually impaired at low cost.

SUMMARY OF THE INVENTION

In a first embodiment of the present invention, a device for assisting a person in determining the presence or identity of obstacles in that person's path is provided. The device includes a housing; a laser projector for generating a laser pattern on a surface in said person's path; a receiver for at least receiving a plurality of images of said laser pattern reflected from said surface and for generating a signal corresponding to said laser pattern; a processor for processing said signal to at least determine the presence or identity of an object; and a warning generator for generating a warning to said person.

In a further embodiment, the invention provides a means to electronically detect obstacles comprising: either a self-contained, independent hand-hold device or a housing that can mounted to a vehicle, walking cane, or other aid; a laser projector that generates a plurality of non-parallel, intersecting laser lines in the form of a pattern; a solid state camera that records the reflected laser line patterns as images; an image background removal processing means to reduce computing time and the need for powerful computers; an edge detection processing means; a processing means to determine if the laser pattern projected at a non-normal angle to an object is recorded by the camera as a distortion of the original pattern; an annunciation means, audible or tactile, to alert the user of an impending obstacle. In addition, with the storing of a plurality of distortion patterns in solid state memory, the invention could also be employed to identify obstacles by comparing the camera's recorded image against a plurality of stored images.

BRIEF DESCRIPTION OF THE DRAWINGS

The accompanying drawings illustrate preferred embodiments of the invention as well as other information pertinent to the disclosure, in which:

FIG. 3 is a cross-sectional view of a preferred detector system;

FIG. 4 A-C comprise reflective laser patterns in a "X" configuration with additional laser lines shown in FIGS. 4 B and 4 C;

DETAILED DESCRIPTION

Figure 1:
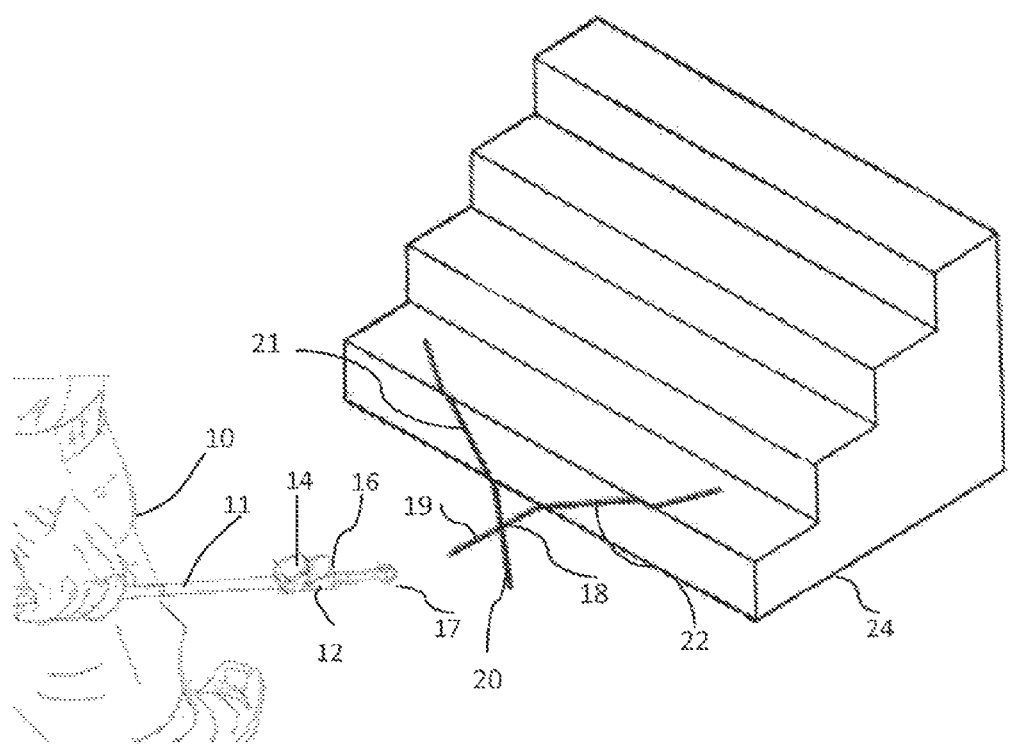
FIG. 1 is a front perspective view showing a person holding the device of this invention and approaching a stairway, further illustrating a non-uniformity of the projected laser pattern.

Although obstacle detection can be used in a variety of embodiments including human hand-held games, vehicles, wheelchairs, robots, and a number of moving objects, one preferred embodiment is shown in FIG. 1 as a walking cane for the blind and visually impaired.

Referring to FIG. 1, a blind or visually impaired person 10 carries a cane 11 as he walks. The cane typically is constructed from light weight metal, fiberglass or plastic with is tip 17 at the bottom end to help the person "feel" his way along. Attached to the top side of the cane 11, detector system 12 consists of en infrared laser projector 14 and solid state camera assembly 16. Other elements of detector system 12 are referenced in the discussion relevant to FIG. 3. The infrared light spectrum is used for eye safety, unobtrusiveness and for easier detection by a solid state camera imager. An infrared laser beam pattern 18 is projected from the projector 14 in front of the person 10. The laser pattern is aligned such that it extends approximately twenty four to thirty inches in front of the cane. Stairs 24 represents an obstacle often encountered by visually impaired people in the act of walking. Other obstacles could include, street curbs, pot holes, other people, vehicles, walls, etc.

In this embodiment, the laser pattern projected at an angle onto a surface consists of a plurality of non-parallel, intersecting laser lines arranged in an "X" pattern 18. Other non-parallel, intersecting line patterns can be used as well and will be discussed later. On a flat surface the legs 19 and 20 of pattern 18 appear as an "X", but appear to break into several segments 21 and 22 when protected onto stairs 24 at an angle. One important aspect of this invention is the ability of the detector system 12 to distinguish between continuous straight line segments and those same line segments appealing as distorted or broken up into one or more non-continuous angled line segments.

Figure 2:
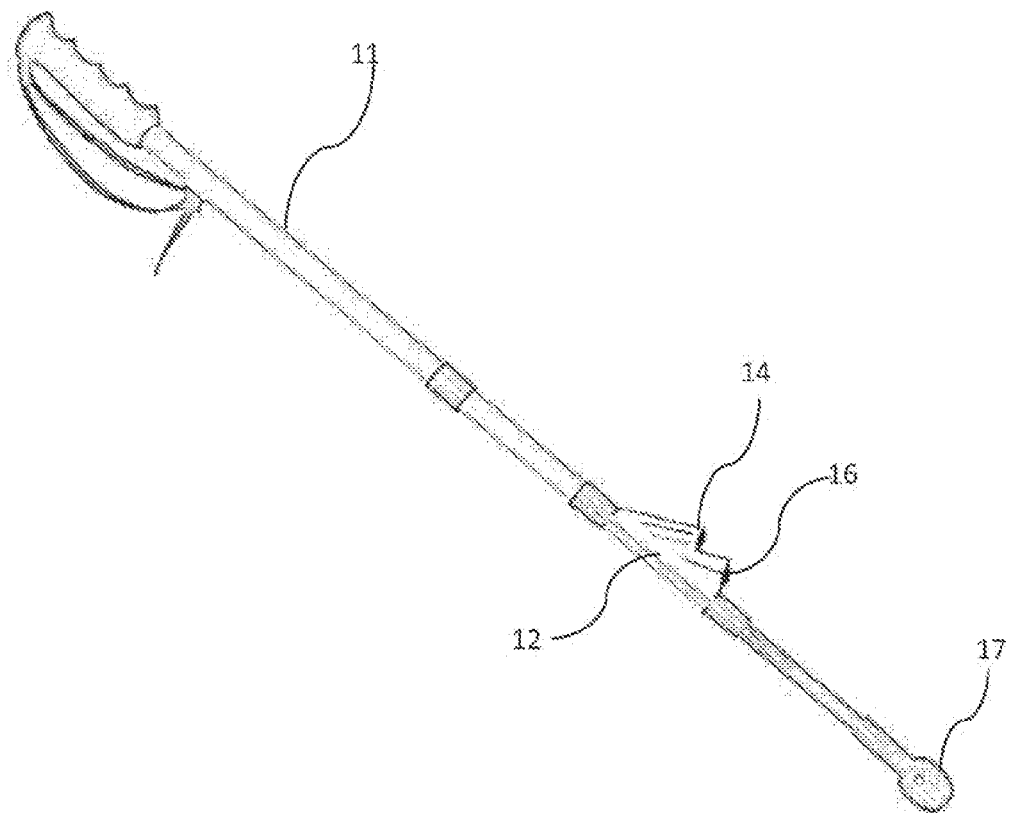
FIG. 2 is a side elevation view of a cane equipped with the device of the present invention.

In FIG. 2, a typical walking cane 11 can be equipped with a detector system 12 attached to the cane. A top side attachment is preferred in order to project a laser pattern from laser projector 14 about twenty four to thirty inches in front of the cane tip 17 and for the camera 16 to have an unobstructed view of the projected pattern. The detector system 12 can be attached to cane 11 in a variety of ways including hose clamps, screws, clip-on, snap fit and adhesives.

Referring to FIG. 3, a preferred embodiment for the detector system 12 consists of a case enclosure or housing 41, a solid state laser projector 14, a receiver or camera assembly 16, a printed circuit board assembly 58 and a speaker 45. The laser projector 14 consists of a laser diode module 44, a set of cylindrical lenses 46 and 48 oriented at 90 degrees to each other and a cable 43 attached to printed circuit board 58. While cylindrical lenses are shown, alternatives including diffraction optical elements can be employed. Diffractive elements are thin phase elements that operate by means of interference and diffraction to produce arbitrary distributions of light These diffractive elements in the form of analog, continuous-phase diffractive elements represent cost-effective solutions and enable the construction of more general laser patterns.

Further in FIG. 3, a receiver, such as a device that can measure reflected electromagnetic wave patterns, such as a solid state camera assembly 16, consists of a body 54, a focusing lens 56, a two dimensional imager and board with electronics 50 and a cable 51 connected to a main circuit board 58. The imager can be fabricated from CMOS (Complementary Metal Oxide Semiconductor) or CCD (Charge Couple Device) technologies and is commonly found in web cams and cell phone cameras. The resolution of the camera used in this embodiment can be typically 1 or 2 Mega Pixels. But as technology advances and costs come down, higher resolutions can be employed in meeting the objectives of this invention.

A preferred piece of the detector system 12 is a printed circuit board 58 containing electronic processing capabilities using a microprocessor, memory, input/output facilities, connectors and support for the firmware used to control the laser pattern, camera functions and image processing algorithms used to evaluate distortions in the beam pattern. Another preferred aspect of this invention is the electronic detector's ability, in real time, to discern changes in the beam pattern as an indicator of a pending object in the user's path. The fabrication of the printed circuit board and its electronic components is widely known to those versed in the art and will not be explained in detail here.

The remaining piece of the detector system 12 is an annunciator means. In this embodiment, it consists of a speaker 45 and a cable 47 connected to printed circuit board 58 used to sound an alarm or issue a voice message. However this could be a jack for head phones, vibrating motor, connection to finger actuators to represent Braille or any combination thereof.

Typical laser line patterns are represented in FIGS. 4a, 4b and 4c. By extension, any number of non-parallel, intersecting projection lines can be fabricated using diffractive elements. In FIG. 4a, an "X" pattern 60 consisting of line segments 62 and 64 form a projected pattern normal to a flat surface. FIGS. 4b and 4c show alternative forms of line segments. Any one of an infinite set of patterns could be used.

By using a non-parallel intersecting line pattern, the orientation of the invention whether up or down (pitch), rotated (yaw) or turned (roll) relative to an obstacle's position becomes less critical to the detection of distorted or broken line segments in the projection pattern. This is because one or both of the beam segments will appear, in the majority of orientations, as non-continuous, broken segments. It follows that increasing the number of non-parallel intersection line segments as in FIGS. 4b and 4c may further improve the inventions's orientation tolerance.

Figure 5:
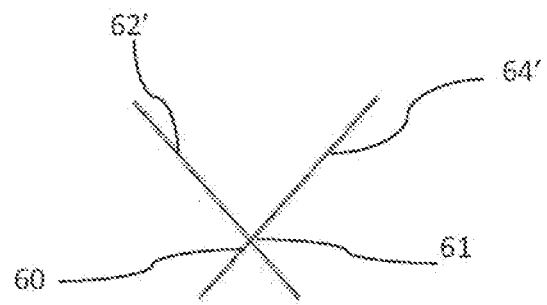
FIG. 5 is a reflective laser pattern in a "X" design projected on a surface other than normal (90°)

In FIG. 5, it can be seen that when an "X" pattern 60 is projected onto flat surface, but at an angle other than normal (90 degree), the line segments 62' and 64' and their intersection 61 are no longer symmetrical to each other. However, this non-symmetry is of little consequence in achieving the objectives of this invention. As will be seen, discontinuity, distortion or line segments broken into multiple angled line segments are the important indicators of a potential obstacle.

Figure 6:
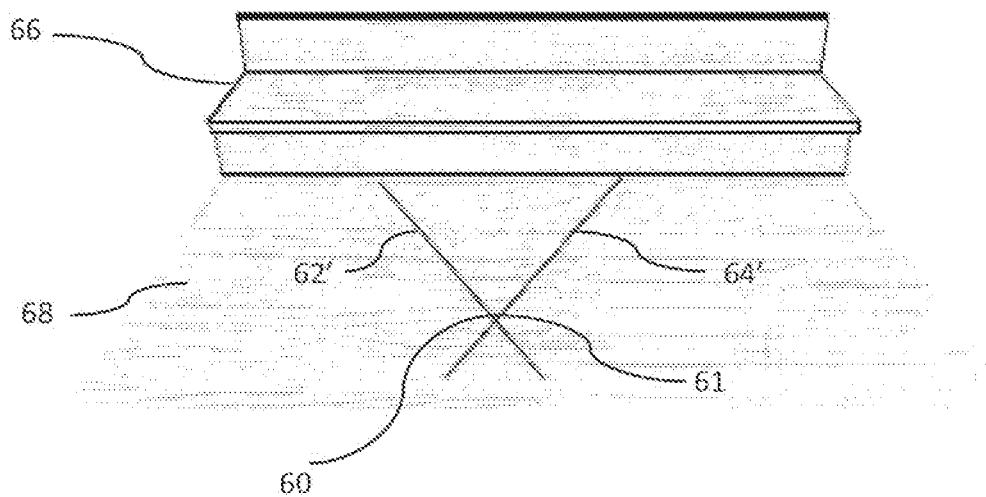
FIG. 6 is a front perspective view of the laser pattern of FIG. 5 before it encounters a stair.

FIG. 6 consists of stairs 66 rising above a flat floor 68. Stairs are typical obstacles that blind or visually impaired people must contend with and are used here as an example. Other obstacles like pot holes, street curbs, vehicles, other people etc. can be detected by the invention in a similar manner. In FIG. 6, the laser line pattern 60, composed of straight lines 62' and 64' and their intersection 61 non-symmetrical but consists at straight, continuous line segments. Consequently, this pattern is processed by the detector system 12 in FIG. 3 as a normal pattern and not an obstacle.

Figure 7:
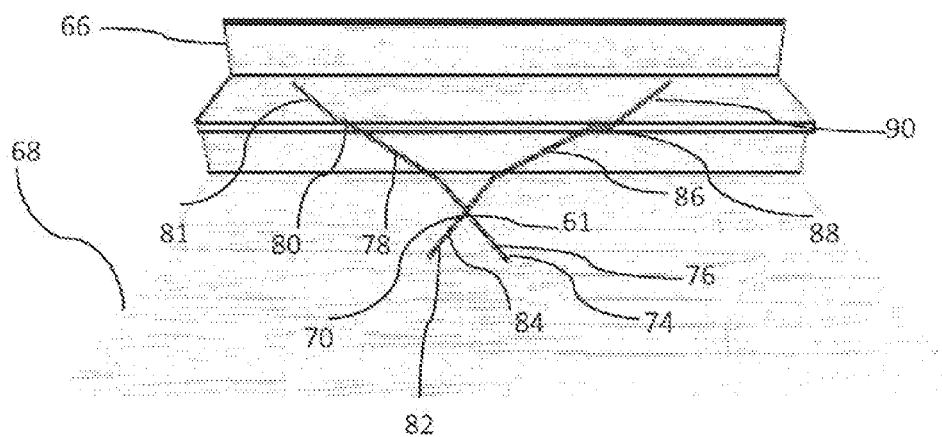
FIG. 7 is a front perspective view of the reflective laser pattern of FIG. 5 after it strikes the stairs of FIG. 6, further showing distorted and broken straight line segments.

As seen in FIG. 7, when the pattern 60 in FIG. 6 strikes the stairs at an angle, it now appears visually distorted and broken into several non-continuous straight line segments. From the recording camera's 16 angled point of view, the resulting projected laser line pattern 70 in FIG. 7 consists of non-continuous line segments 74 and 82 intersecting at point 61. Subsequently, non-continuous line segment 74 is composed of individual line segments 76, 78, 80 and 81. Non-continuous line segment 82 is composed of individual line segments 84, 86, 88 and 90. When a straight laser line is projected at a non-normal angle onto multiple surfaces of different heights, a three dimensional optical effect occurs. Here, normally protected continuous lines appear broken into several non-continuous line segments. Using this information, embedded processing firmware can detect the presence of an obstacle.

Figure 8:
FIG. 8 is front perspective view of the stairs and floor captured as an image with the laser module pulsed off.
Figure 9:
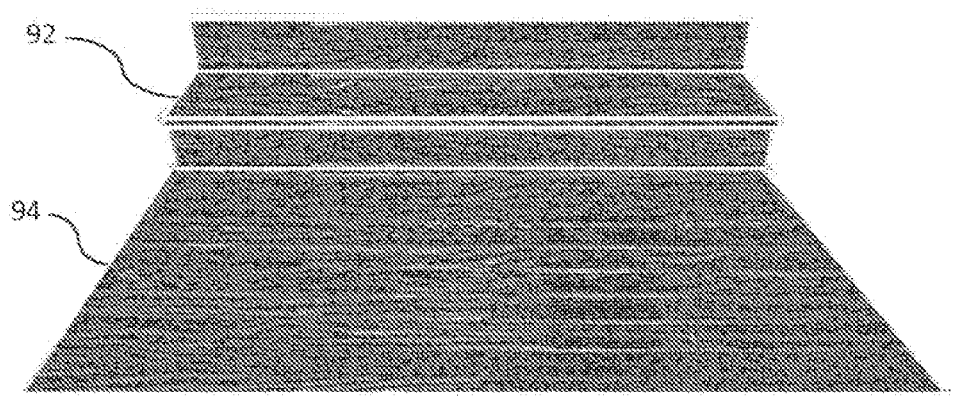
FIG. 9 is a front perspective view showing a negative image of the stairs and floor of FIG. 8 which can be used to subtract the background from the laser image of FIG. 7.
Figure 10:
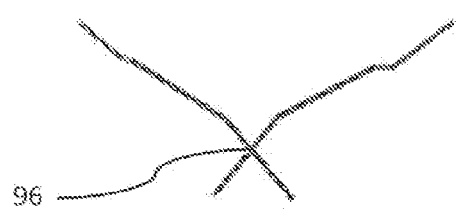
FIG. 10 is an isolated laser line pattern after subtracting the background image.

An object of this invention is to simplify laser line pattern detection while accurately ascertaining the presence of an obstacle. In most computer vision systems, a significant amount of computer processing power is expended on isolating the desired image pattern from the background. In this invention the laser diode module 44 in FIG. 3 is pulsed on-off at a rate of approximately 10 to 30 times a second with an approximate 50% duty cycle. The camera assembly 16 in FIG. 3 is programmed to capture a received image while the laser module is pulsed on and again while it is pulsed off. In FIG. 7, the background stairs, floor and projected laser pattern are captured as an image while the laser module is pulsed on. In FIG. 8, only the stairs 66 and floor 69 are captured as a second image when the laser module is pulsed off. The microprocessor firmware on board 58 of FIG. 3 then digitally inverts the image in FIG. 8 resulting in a negative image in FIG. 9. The negative image in FIG. 9 is then digitally added to the image in FIG. 7, effectively subtracting the background from the image in FIG. 7. The result is an isolated laser line pattern in FIG. 10. Through the firmware processing, distorted or non-continuous line segments are determined to be an obstacle.

Digital inversion is preferably accomplished at the pixel level. Since a digital image comprises a multitude of pixels forming a two dimensional bit map, each pixel has an X and Y coordinate position in the bit map, an intensity value Z and a color value W. This information is in the form of a binary representation. As a simple example, if the original pixel of the background image is brown with a component color value of 0 1 0 1 1 1 0 0, its binary compliment would be 1 0 1 0 0 0 1 1. By adding the original value and its compliment together, the result is 1 1 1 1 1 1 1 1 binary. In most systems this is white and the new background at that pixel is now white. By repeating this process for each pixel in the X, Y coordinate space, the entire background can be erased and replaced with a white background.

Now, when the laser module is pulsed on, the pixel located on the laser line may have a color other than brown. When the laser line pixel color value is added to complimented background pixel color value stored earlier when the laser module was pulsed off, than the resulting pixel will appear as a non-white color on a white background. For example, a red pixel with a component color 1 1 1 0 1 1 1 0 when added to the complimented background color of 1 0 1 0 0 0 1 1, results in a color value of 1 0 0 1 0 0 0 1 with a carry bit. Since this value is other than white (1 1 1 1 1 1 1 1) we can say that pixel is part of the laser line.

Where the color values of the complimented background pixel and the foreground laser pixel are too close to the background color, we can instead use the intensity value Z of the pixels to determine if the pixel is part of the laser line. If that also fails, we can drop that pixel and by extrapolation from the surrounding laser line pixels, fill in the questionable pixel. As discussed previously, the main objective is to determine whether the laser line recorded by the camera appears distorted or no longer continuous and therefore infer that an obstacle is present.

Additional means to enhance the received laser line pattern image while effectively removing the image background may be added as well. These include but not limited to: 1) adding a narrow band optical infrared filter corresponding to the laser module wavelength to the camera assembly 16 in FIG. 3, 2) voltage/current modulation of the laser module to create a series of laser patterns with varying intensities to filter out ambient sun light, and 3) manipulation of the contrast, brightness, color saturation and exposure controls in the camera's imager firmware to enhance the received laser light pattern and reduce the effect of the background.

Once the image background is effectively removed, a means of edge detection is employed to determine if a normally straight, continuous laser line appears broken into one or more non-continuous, angled line segments. Digital image processing employing forms of edge detection in computer vision systems is well known in the art. While the preferred embodiment of this invention uses a detection method called Canny optimal edge detection, developed by John F. Canny in 1986, many other types of detection methods can be employed such as Gaussian Function, Gaussian Convolution, Gaussian Smoothing, DoG (Difference of Gaussian mask), Zero-crossings, Grey-Level Gradient, and others. Canny is particularly useful in this invention because it combines Gaussian Smoothing with thresholds of pixels relative to adjacent pixels. When the X, Y coordinates of these high threshold pixels are calculated in the processing firmware, a line or line segment can be determined. By comparing the continuity of the original laser beam pattern line segments with the received image of non-continuous, broken line segments, the processing firmware can make a go, no-go obstacle detection decision.

While an object of this invention is obstacle detection, further processing of the received line pattern can also lend itself to obstacle recognition. As opposed to detection alone, recognition can determine what kind of obstacle is being observed. Comparison between received patterns of stairs, pot holes and walls against pre-determined patterns of these obstacles makes this possible. Once a definitive decision is made by the firmware that an obstacle exists and what the obstacle is, feedback through an alarm sound, voice message, vibration or mechanical actuation can instruct the user to what kind of obstacle is ahead.

Another embodiment for guiding the visually impaired or for games consists of a laser projector attached to a smart phone. Using the same techniques described earlier in projecting a laser pattern, recording the pattern as an image against a background scene, digitally removing the background scene, detecting non uniformity of the projected pattern line segments signifying an obstacle and communicating that to the user, a smart phone already contains most of the elements required for the invention; namely a) a solid state camera, b) processor, c) speaker or earphone, d) vibration device, and e) a portable housing. The only item missing is a laser pattern projector. In this invention the laser projector consists of an add-on laser pattern protector accessory attached to the smart phone and digitally connected through the smart phone's USB or synchronizing connector through a snap-on back case 104 in FIG. 11.

By using an existing smart phone hardware platform and its ability to run firmware applications, an extremely cost effective obstacle detector is achieved with just the addition of a low cost, solid state, laser pattern generator. When playing a game such as "manhunt" in the dark the invention would help players avoid stepping into holes and running into trees or other obstacles. It could also be employed as a critical part of a scavenger hunt game where players use the invention to detect and identify objects in low light or dark spaces.

Another aspect of the invention when used with a smart phone is its subtlety. The visually impaired do not want to stand out in to crowd. Using a smart phone to scan for obstacles allows the visually impaired user to blend in with many other smart phone users as they read messages or use applications while walking.

Figure 11:
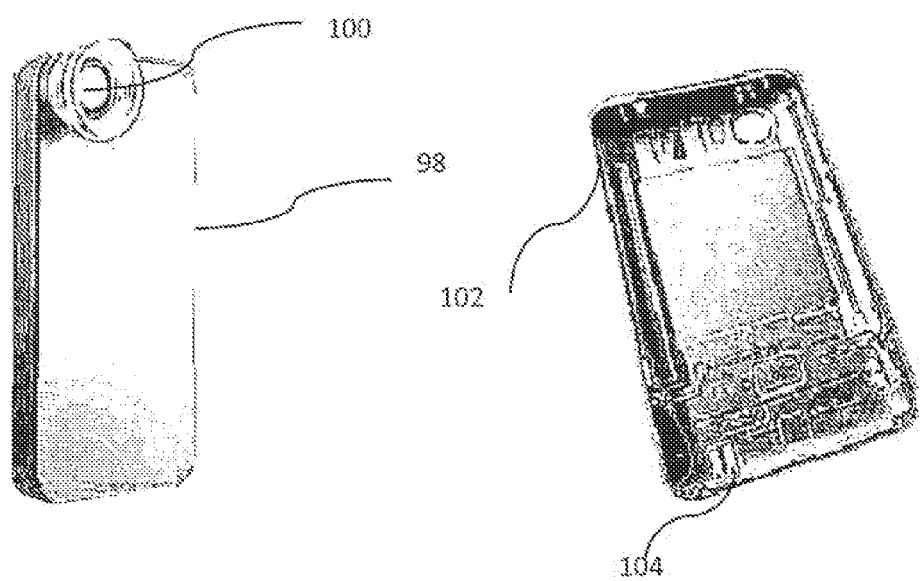
FIG. 11 is a front perspective view of a smart phone equipped with a laser projector attachment and a reverse perspective view of said smart phone showing phone accessory connector points.

In FIG. 11, a possible mounting for the laser projector is in the form of a smart phone back case is illustrated. The outside of the back case 98 houses the laser projector assembly 100. The electrical connections from the laser projector 100 run along the inside of case 102 to the phone accessory connector points 104 at either the bottom or along the side depending upon the smart phone configuration. In this way, the applications firmware in the smart phone can be written to pulse the laser through the phone's accessory connector to facilitate the background scene removal process discussed earlier. The case also facilitates a convenient and robust method far mounting the laser projector assembly 100.

Figure 12:
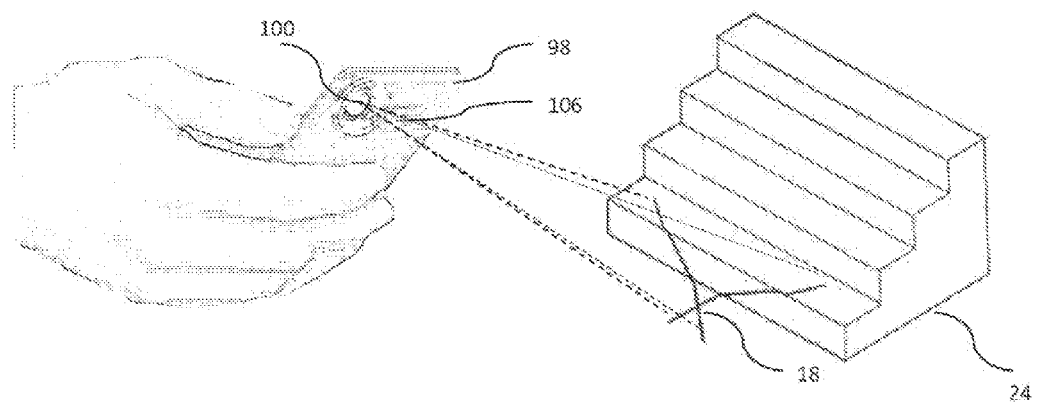
FIG. 12 is a front perspective view showing a smart phone embodiment of the present invention using its built in camera to record a laser pattern on a stairway in the person's path.

Referring to FIG. 12, smart phone 98 is held by the user so that its built-in camera 106 points out and in front. As a snap-on back case accessory, the laser pattern projector 100 projects a pattern 18 onto any obstacle that may be 24" to 30" in front of the user. In this example, the projected pattern onto stairs 24 appears as a distorted image to the phone's camera. As described earlier, the snap-on laser projector in a smart phone accessory case provides both a fixed location and a means to connect to the phone's digital accessory signals at the bottom or on the side. Just as in the laser cane embodiment, the phone's built-in camera and processor pulses the laser pattern projector, records the scene with and without the laser pattern, digitally subtracts the scene's background to isolate the distorted patterned reflected form the stairs, applies the edge detection algorithm, determines if the reflected pattern is an obstacle or not and through the phone's built-in speaker, earphones and/or vibrator communicates to the user that an obstacle is ahead.

Figure 13:
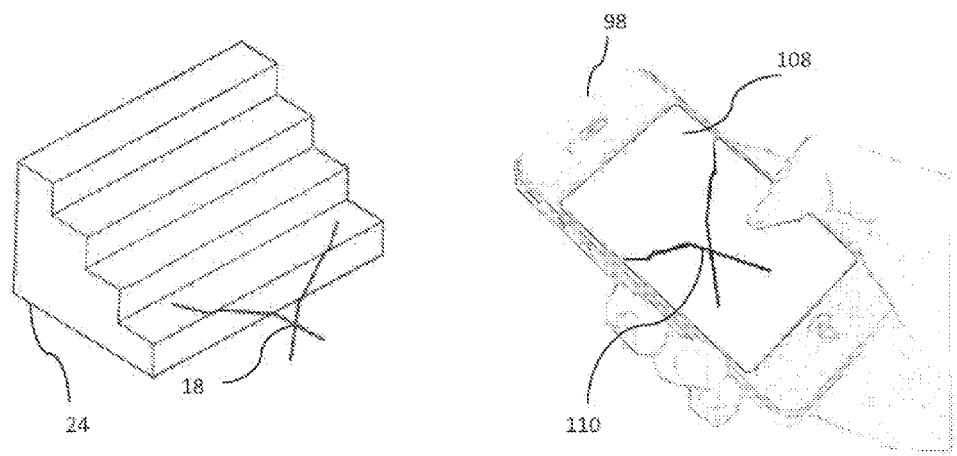
FIG. 13 illustrates a front perspective view of the smart phone embodiment of the present invention and stairway, illustrating how an obstacle at night may appear on said phone's screen to a sighted user when used in a game or at night for detecting obstacles.

FIG. 13 illustrates how an obstacle at night may appear on the phone's screen to a sighted user when used in a game or at night for detecting obstacles. Phone 98 with its built-in screen 108 can display the captured, distorted image 110 of to potential object or obstacle. Together with sound and/or vibration, the screen could also indicate an impending object and alert the user.

In addition to detecting obstacles, predetermined distortion patterns stored in the processors memory could also be used to identify objects or obstacles. The application firmware in the phone would store representative patterns of pot holes, curbs, walls, stairs, etc. and compare the stored patterns against the non-uniform patterns recorded by the phone camera. Once an approximate match was made, communication through the phone's speaker, earphone, screen text or coded vibrations to the user could alert the user to an obstacle and it's type. The user could therefore take appropriate action to avoid injury or damage.

The present invention will be further explained and illustrated by the attached claims.

What is claimed:

1. A device for assisting a person in determining the presence or identity of obstacles in that person's path, characterized by:
    a housing;
    a laser projector for generating a laser pattern on a surface in said person's path;
    a receiver for at least receiving at least one first image including the surface in the person's path and at least one second image including the surface in the person's path and said laser pattern reflected from said surface;
    a processor configured to:
        digitally subtract a background image of the person's path to isolate the laser pattern reflected from the surface, and
        determine the presence or identity of an object in the person's path based on the laser pattern reflected from the surface, and
        cause a warning generator to generate a warning to said person.

2. The device of claim 1, wherein said laser projector comprises an infrared laser projector.

3. The device of claim 1, wherein said receiver comprises a camera.

4. The device of claim 1, wherein said laser pattern comprises a plurality of non-parallel laser lines.

5. The device of claim 4, wherein said plurality of non-parallel laser lines are arranged in an intersecting pattern.

6. The device of claim 1, wherein said processor can distinguish between continuous straight line segments generated by said laser projector, and distorted versions of said continuous straight line segments.

7. The device of claim 6, wherein said distorted versions of said continuous straight line segments represent an indication of an object in that person's path.

8. The device of claim 1, wherein said receiver, processor, and warning generator comprise portions of a smart phone, and said laser projector comprises an attachment to said smart phone.

9. The device of claim 8, wherein said receiver comprises a built-in camera of said smart phone and said built-in camera records said person's path with and without the laser pattern, and digitally subtracts a background scene from said person's path to isolate said laser pattern reflected from its surface.

10. The device of claim 1, wherein the processor is configured to
    create an inversion of the at least one first image, and
    add the inversion of the at least one first image to the at least one second image to digitally subtract the background image of the person's path.

11. The device of claim 1, wherein the processor is configured to apply an edge detection algorithm to the isolated laser pattern reflection.

12. A device for assisting a person to determine the presence or identity of an object in that person's path, characterized by:
    a smart phone having a camera, a processor, and a warning generator for generating a signal which can be felt or heard by said person;
    a laser projector attachment for connecting to said smart phone, said laser projector attachment configured to generate a laser pattern which can be recorded by the camera,
    wherein the camera is configured to acquire a first image of the person's path without the laser pattern being projected by the laser rojector attachment and to acquire a second image of the person's path with the laser pattern being projected by the laser projector attachment, and
wherein the processor is configured to
digitally subtract the first image from the second image to isolate a reflected laser pattern, and
detect a non-uniformity in the reflected laser pattern indicative of an object in the person's path.

13. The device of claim 12, wherein the processor is configured to create an inversion of the first image and add the inversion of the first image to the second image to digitally subtract the first image from the second image.

14. A method, comprising:
acquiring a first image of a surface in a person's path;
generating a laser pattern comprising a plurality of laser lines on a surface in said person's path;
acquiring a second image of the surface in the person's path and a reflection of the laser pattern;
subtracting the first image from the second image to isolate the reflection of the laser pattern;
distinguishing between one or more straight line segments in the reflection of the laser pattern and distorted line segments in the reflection of the laser pattern; and
evaluating the distortions in said line segments in the reflection of the laser pattern to determine at least one of a presence and an identity of an object in said person's path.

15. The method of claim 14, further comprising storing the first image in a memory prior to acquiring the second image.

16. The method of claim 15, wherein said distinguishing step comprises detecting a non-uniformity of one or more laser pattern line segments in the reflection of the laser pattern indicative of an obstacle in said person's path.

17. The method of claim 14, further comprising applying an edge detection algorithm to a stored image to determine if the reflected pattern is an obstacle.

18. The method of claim 17, wherein said method further comprises generating a warning signal to said person when an obstacle is detected.

19. The method of claim 17, wherein said method comprises generating a warning signal to said person that helps said person identify said object.

20. The method of claim 14, wherein subtracting the first image from the second image includes
creating an inversion of the first image, and
adding the inversion of the first image to the second image.

* * * * *